US012562190B1

(12) United States Patent
Szita et al.

(10) Patent No.: US 12,562,190 B1
(45) Date of Patent: Feb. 24, 2026

(54) COHERENT REPEATABLE RUNOUT CORRECTION FOR REDUCED RPM SELF-SERVO WRITE

(71) Applicants: Kabushiki Kaisha Toshiba, Tokyo (JP); Toshiba Electronic Devices & Storage Corporation, Tokyo (JP)

(72) Inventors: Gabor Szita, Mountain View, CA (US); Anton Gerasimov, Santa Clara, CA (US); Li Zhang, Fremont, CA (US); Gary W. Calfee, Santa Clara, CA (US)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/056,690

(22) Filed: Feb. 18, 2025

(51) Int. Cl.
G11B 5/596 (2006.01)

(52) U.S. Cl.
CPC ...... G11B 5/59666 (2013.01); G11B 5/59627 (2013.01); G11B 5/59661 (2013.01)

(58) Field of Classification Search
None
See application file for complete search history.

(56) References Cited

U.S. PATENT DOCUMENTS

| | | | |
|---|---|---|---|
| 7,161,759 B1 * | 1/2007 | Zhang | G11B 5/59688 360/75 |
| 7,375,918 B1 | 5/2008 | Shepherd | |
| 8,059,360 B1 * | 11/2011 | Melkote | G11B 5/59661 360/77.04 |
| 8,749,904 B1 * | 6/2014 | Liang | G11B 5/59627 360/77.08 |
| 2006/0209449 A1 * | 9/2006 | Ehrlich | G11B 5/59633 360/75 |
| 2008/0030894 A1 * | 2/2008 | Sun | G11B 5/59627 360/98.02 |
| 2011/0176400 A1 * | 7/2011 | Gerasimov | G11B 20/1217 |
| 2013/0038959 A1 * | 2/2013 | Liang | G11B 5/59627 |
| 2016/0351220 A1 * | 12/2016 | Shibata | G11B 5/59627 |

* cited by examiner

*Primary Examiner* — Peter Vincent Agustin
(74) *Attorney, Agent, or Firm* — Kim & Stewart LLP

(57) ABSTRACT

Self-servo write (SSW) is performed in a disk drive while rotating disks at an SSW rotational speed, such that the resultant product servo patterns have near-zero coherent runout when rotating the disks at an operational rotational speed. The natural uncontrolled path of a magnetic head of the drive is characterized at the operational rotational speed and at the SSW rotational speed, and the difference between the two uncontrolled paths is injected into the servo loop to modify the path of the magnetic head during the SSW process. Specifically, the natural uncontrolled path of the magnetic head of the drive at the normal operating rotational speed is characterized with a first set of non-circularity values, and the natural uncontrolled path of the magnetic head of the drive at the SSW rotational speed is characterized with a second set of non-circularity values.

20 Claims, 8 Drawing Sheets

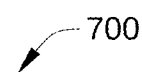

700

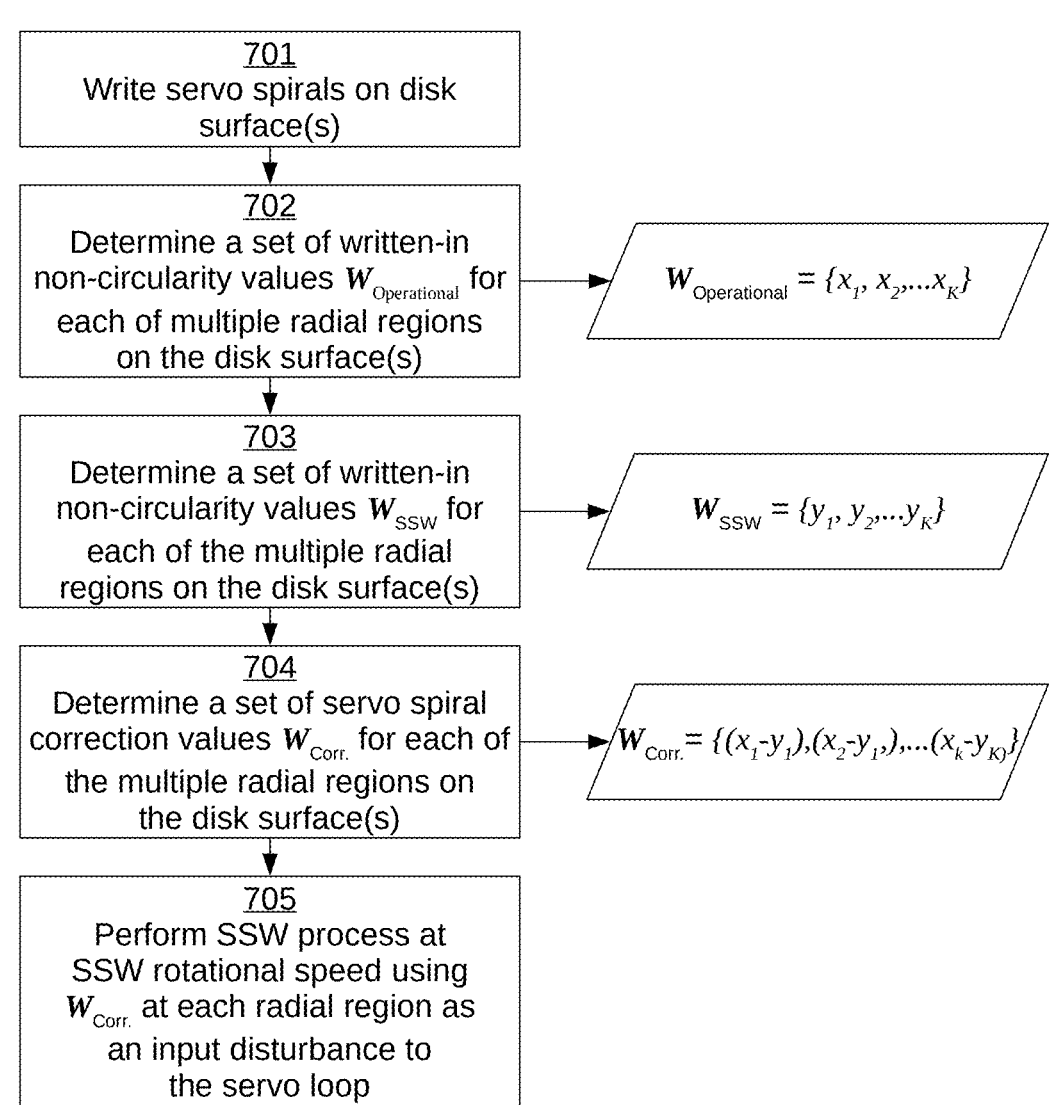

701
Write servo spirals on disk
surface(s)

702
Determine a set of written-in
non-circularity values $W_{\text{Operational}}$ for
each of multiple radial regions
on the disk surface(s)

$W_{\text{Operational}} = \{x_1, x_2, ... x_K\}$

703
Determine a set of written-in
non-circularity values $W_{\text{SSW}}$ for
each of the multiple radial
regions on the disk surface(s)

$W_{\text{SSW}} = \{y_1, y_2, ... y_K\}$

704
Determine a set of servo spiral
correction values $W_{\text{Corr.}}$ for each of
the multiple radial regions on
the disk surface(s)

$W_{\text{Corr.}} = \{(x_1\text{-}y_1), (x_2\text{-}y_1), ... (x_k\text{-}y_K)\}$

705
Perform SSW process at
SSW rotational speed using
$W_{\text{Corr.}}$ at each radial region as
an input disturbance to
the servo loop

FIG. 7

COHERENT REPEATABLE RUNOUT CORRECTION FOR REDUCED RPM SELF-SERVO WRITE

BACKGROUND

For proper operation of a hard disk drive (HDD), a magnetic head of the HDD must be positioned at a desired radial location with high accuracy. For example, when reading data from or writing data to a particular data track of the HDD, the magnetic head is precisely positioned at a specific data track center to avoid read errors or overwriting data in adjacent data tracks.

Deviation of the actual radial position of a magnetic head from an ideal or intended radial position causes the magnetic head and associated electronics to generate a position error signal (PES), and can be divided into two components: non-repeatable runout (NRRO) and repeatable runout (RRO). NRRO at a particular location on a disk is different with each revolution of the disk and is typically computed by subtracting the repeatable runout (RRO) from a raw PES measurement. By contrast, RRO repeats for each disk revolution, and is typically caused by disk distortion, inaccurately positioned servo patterns on the disk (such as servo spirals or servo wedges), and media noise. RRO is typically computed using sector-by-sector synchronous averaging of the raw PES, where the raw PES is measured over multiple disk revolutions for a particular radial location on the surface of a disk, such as a data track.

RRO can be further divided into two components: coherent RRO and non-coherent RRO. Coherent RRO is the portion of RRO that is identical in a region of adjacent data tracks, and is typically caused by disk distortion and coherent inaccuracies in the positioning of the write head when servo patterns are written on the disk. Non-coherent RRO is the portion of RRO that is different in adjacent data tracks, and is largely the result of media noise associated with microscopic variations in the size and/or position of the magnetic grains making up the surface of a disk. Because such media noise contributes to RRO as random white noise, non-coherent RRO in one data track cannot be predicted based on the non-coherent RRO of an adjacent data track.

Excessive coherent RRO in an HDD can be problematic in certain situations, including during the self-servo writing process, which is performed by the drive as part of the drive-manufacturing process. Self-servo writing is a well known approach for writing the product servo patterns and other servo sector information for each data track on a disk by using the magnetic reading and writing heads and the servo system of the HDD. One of the well know approaches of self-servo writing is a spiral-based process, in which a set of spirals are written on one or more disk surfaces of the HDD. The HDD servo system then positions the magnetic heads of the disk drive based on these spirals, and writes the product servo patterns on the disks.

In general, it is desirable for the product servo patterns to be written to each disk in such a way that the written-in coherent RRO of the resultant servo pattern is minimized. As a result, during normal operation, the product servo patterns for each data track closely correspond to a natural path of the magnetic head over the disk when no control is applied to the magnetic head actuator. However, the spiral patterns used for self-servo writing typically have significant coherent RRO components, for example due to macroscopic deflections of the disk and/or inaccurately written spirals. Positioning the magnetic reading and writing heads of the HDD based on such spiral patterns during self-servo writing can pass these coherent RRO components on to the product servo patterns, which adversely affects the performance of the HDD and is highly undesirable. To prevent this, during the self-servo writing process, appropriate RRO correction factors are computed for each spiral and injected into the servo loop when the product servo patterns for each data track are being written. The effect of the correction factors is to cause the magnetic head of the HDD to follow a path that much more closely corresponds to the natural path of the magnetic head over the disk (referred to herein as the "uncontrolled path" or the "circular path"). This, in turn, can greatly reduce or eliminate coherent RRO of the product servo pattern.

To further improve the accuracy of the self-servo write process, the rotational speed of the disks can be reduced while the product servo pattern is written to the disk. For example, in an HDD with a nominal rotational speed of 7200 rotations per minute (RPM), the self-servo write process can be performed at 5400 RPM to reduce the written-in non-repeatable (random) runout in the positioning of the product servo pattern for each data track of the disk. When the product servo patterns are written with less written-in non-repeatable runout, there is less likelihood of track squeeze (in which adjacent data tracks overlap or are too close to each other) and other problems. However, the benefits of performing self-servo write at a lower rotational speed than the normal operating speed of the drive can be more than offset by increased written-in coherent RRO of the product servo patterns. This is because drag and other forces that act on the disk change with rotational speed, causing different disk flutter, motor runout, and the like at different rotational speeds. Consequently, the uncontrolled path of a magnetic head over a particular radial location changes significantly with rotational speed. As a result, the spiral RRO correction factors needed to cause the magnetic head of the HDD to follow the uncontrolled path of the magnetic head at the nominal rotational speed are different than the spiral RRO correction factors needed to cause the magnetic head of the HDD to follow the uncontrolled path of the magnetic head at the lower self-servo writing rotational speed. Thus, writing product servo patterns that closely follow the uncontrolled path of the magnetic head while rotating the disk at a lower rotational speed generally results in product servo patterns that follow a significantly different path when the disk is rotated at a different rotational speed, thereby causing significant coherent RRO of the magnetic head during normal operation of the HDD.

In light of the above, there is a need in the art for more accurately writing product servo patterns to a disk via a self-servo write process at an RPM that is different than the nominal operational RPM without increasing coherent RRO of the product servo patterns.

SUMMARY

One or more embodiments provide systems and methods for performing self-servo write (SSW) in an HDD while rotating disks at an SSW rotational speed, such that the resultant product servo patterns have near-zero coherent runout when rotating the disks at an operational rotational speed. In the embodiments, the natural uncontrolled path of a magnetic head of the HDD is characterized at the operational rotational speed and at the SSW rotational speed, and the difference between the two uncontrolled paths is injected into the servo loop to modify the path of the magnetic head during the SSW process. Specifically, the natural uncontrolled path of the magnetic head of the HDD at the normal operating rotational speed is characterized with a first set of non-circularity values, and the natural uncontrolled path of the magnetic head of the HDD at the SSW rotational speed is characterized with a second set of non-circularity values. Each set of non-circularity values includes a discrete value for each servo spiral on the disk. While rotating the disks at the SSW rotational speed, a servo spiral offset value is determined for each spiral based on the difference between the non-circularity value for the spiral in the first set of non-circularity values and the non-circularity value for the spiral in the second set of non-circularity values. During the SSW process, the set of servo spiral offset values is used as non-circularity values by the servo system of the HDD, thereby causing the magnetic head to follow a non-circular path that deviates significantly from the uncontrolled path of the magnetic head while rotating the disks at the SSW rotational speed. Consequently, the resultant product servo patterns that are written in such a process follow a non-circular path when the disks are rotated at the SSW rotational speed. However, when the disks are rotated at the operational rotational speed, changes in the shape and behavior of the disks at the operational rotational speed cause the product servo patterns to follow a path that closely corresponds to the uncontrolled path of the magnetic head while rotating the disks at the operational rotational speed. Thus, the product servo patterns can have the reduced written-in non-repeatable runout associated with being written at a slower rotational speed and can also be free of the written-in coherent runout normally associated with writing the servo patterns at a different rotational speed than the operational rotational speed.

A disk drive, according to an embodiment, includes: a magnetic head, a magnetic disk with a set of servo spirals formed on a surface of the magnetic disk, and a controller. The controller is configured to perform the steps of: while rotating the magnetic disk at a first rotational speed, controlling a radial position of the magnetic head to be at a target radial location based on a set of servo spirals formed on the surface of the magnetic disk; and while the magnetic disk is rotated at the first rotational speed and the magnetic head is controlled to be at the target radial location, for each spiral included in the set of servo spirals: receiving a position error signal associated with crossing the servo spiral; modifying the position error signal with a correction factor that is based on a first non-circularity value associated with the servo spiral at the target radial location and a second non-circularity value associated with the servo spiral at the target radial location, wherein the first non-circularity value for the spiral is determined while rotating the magnetic disk at the first rotational speed and the second non-circularity value is determined while rotating the magnetic disk at a second rotational speed that is different from the first rotational speed; and writing a set of servo wedges at the target radial location.

According to an embodiment, a computer-implemented method of writing servo information on a magnetic disk includes: while rotating the magnetic disk at a first rotational speed, controlling a radial position of the magnetic head to be at a target radial location based on a set of servo spirals formed on the surface of the magnetic disk; and while the magnetic disk is rotated at the first rotational speed and the magnetic head is controlled to be at the target radial location, for each spiral included in the set of servo spirals: receiving a position error signal associated with crossing the servo spiral; modifying the position error signal with a correction factor that is based on a first non-circularity value associated with the servo spiral at the target radial location and a second non-circularity value associated with the servo spiral at the target radial location, wherein the first non-circularity value for the spiral is determined while rotating the magnetic disk at the first rotational speed and the second non-circularity value is determined while rotating the magnetic disk at a second rotational speed that is different from the first rotational speed; and writing a set of servo wedges at the target radial location.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIG. 7 sets forth a flowchart of method steps for performing a self-servo writing process in a hard disk drive while rotating disks at a self-servo writing rotational speed that is different than an operational rotational speed of the drive, according to various embodiments.

DETAILED DESCRIPTION

System Overview

Figure 1:
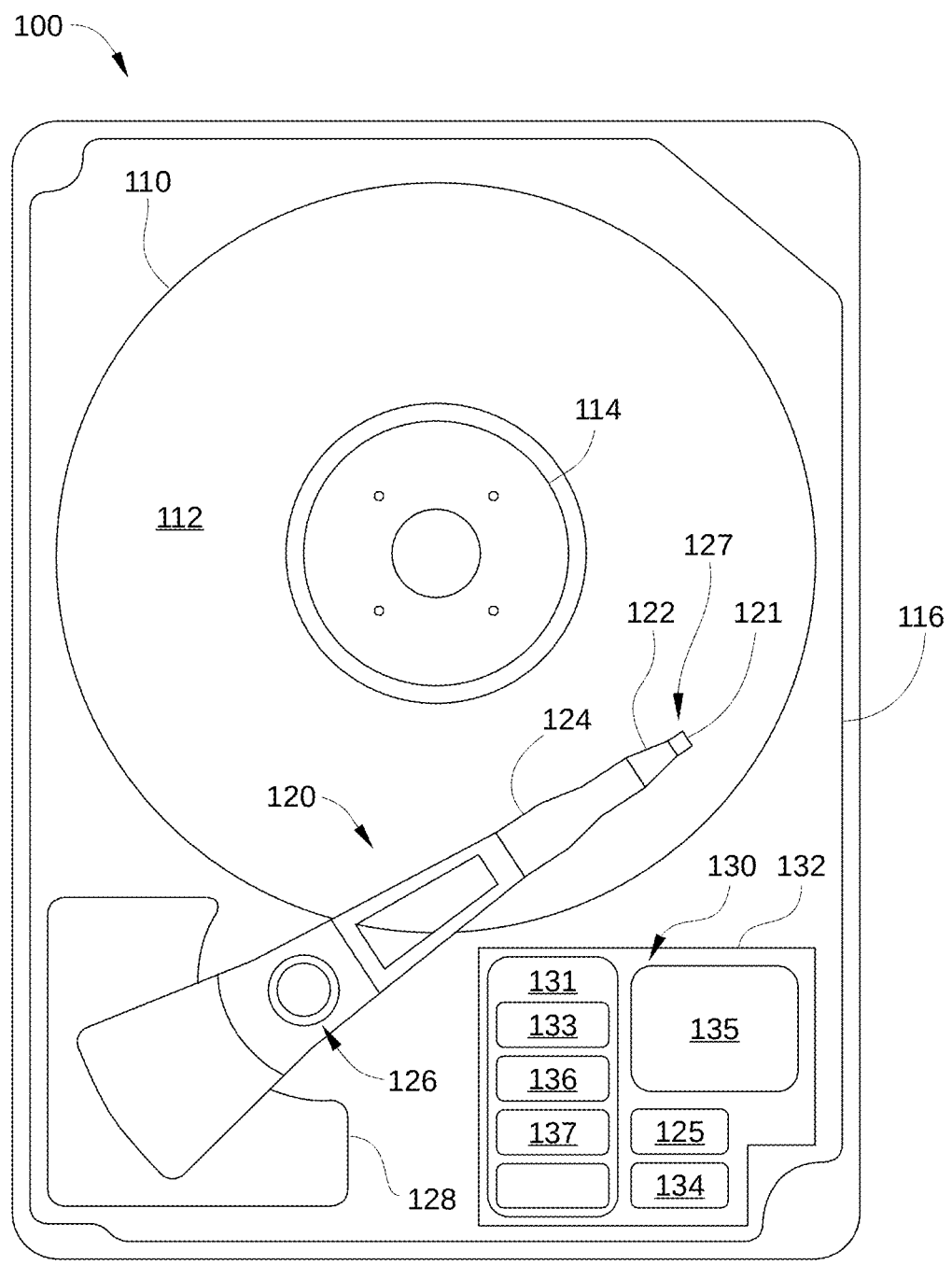
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track.

Each read/write head 127 is a magnetic head that includes a read head and a write head (not shown). The read head of each read/write head 127 is configured to generate an output signal when moving past data or servo information written to the surface of the storage disk 110 that is associated with that read/write head 127. The write head of each read/write head 127 is configured to write information to the surface of the storage disk 110 that is associated with that read/write head 127.

Spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown) can be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers), a flash memory device 135, and, in some embodiments, a flash manager device 136. In some embodiments, read/write channel 137, microprocessor-based controller 133, and/or flash manager device 136 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137 communicates with the read sensor of read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo patterns on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in servo wedges on recording surface 112 as a reference. One embodiment of recording surface 112 and associated servo patterns is illustrated in FIG. 2.

Figure 2:
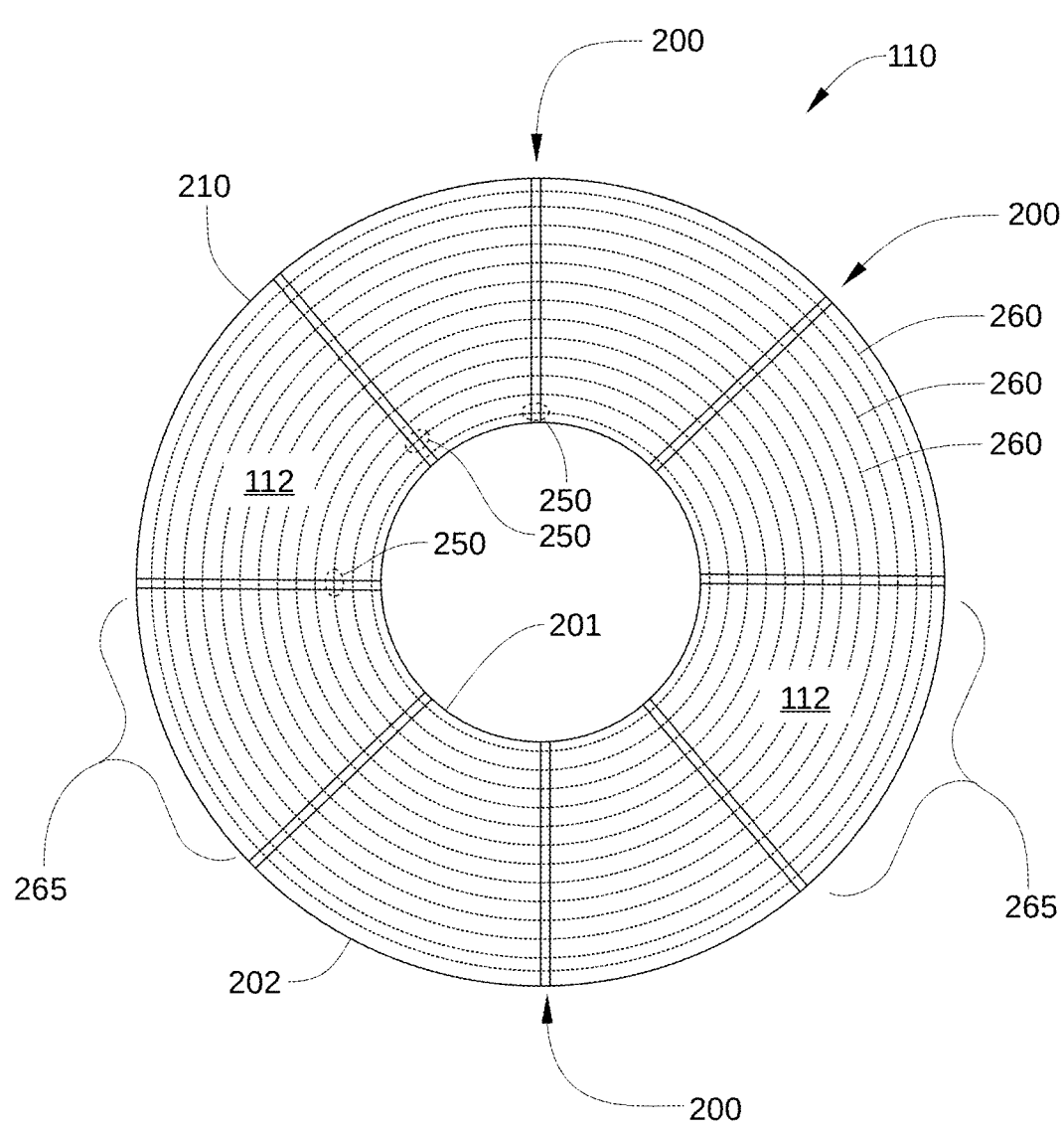
FIG. 2 illustrates a recording surface of a storage disk with servo wedges and concentric data storage tracks formed thereon, according to an embodiment.

FIG. 2 illustrates a recording surface 112 of a storage disk 110 with servo wedges 200 and concentric data storage tracks 260 formed thereon, according to an embodiment. Each servo wedge 200 includes a plurality of servo sectors 250 containing servo patterns and/or other servo information that defines the radial position and track pitch, i.e., spacing, of data storage tracks 260. Servo wedges 200 are written on recording surface 112 via a self-servo-write (SSW) process (described below) in which the servo system of HDD 100 positions a read/write head 127 based on servo spirals previously written on recording surface 112 and writes product servo patterns on recording surface 112 for each data storage track 260. Servo wedges 200 for each data storage track 260 may be substantially radially aligned, as shown. In practice, servo wedges 200 may also be somewhat curved. For example, servo wedges 200 may be configured to mirror the path that would be followed by read/write head 127 if read/write head 127 were to be moved across the stroke of actuator arm assembly 120 while storage disk 110 is not spinning. Such a curved pattern advantageously results in the wedge-to-wedge timing being independent of the radial position of read/write head 127. For simplicity, servo wedges 200 are depicted as substantially straight lines in FIG. 2.

Data storage tracks 260 are formed on recording surface 112 between an ID 201 and an OD 202 of storage disk 110. Data storage tracks 260 for storing data are located in data sectors 265 as shown, and the radial position of each data storage track 260 is defined by the servo information written in servo sectors 250 for that data storage track 260. More specifically, each servo sector 250 for a particular data storage track 260 contains servo information that is read by read/write head 127 during read and write operations to position read/write head 127 above that particular data storage track 260. Typically, the actual number of data storage tracks 260 and servo wedges 200 included on recording surface 112 is considerably larger than illustrated in FIG. 2. For example, recording surface 112 may include hundreds of thousands of concentric data storage tracks 260 and hundreds of radially aligned servo wedges 200.

SSW Process

In order for HDD 100 to perform an SSW process that writes the above-described servo wedges 200 on storage disk 110 with the necessary precision for proper operation of HDD 100, position and timing information are provided to the servo system of HDD 100. The position and timing information that enable the internal servo system of HDD 100 to perform the SSW process is typically in the form of reference spiral tracks or "servo spirals" written on storage disk 110. One embodiment of such servo spirals is illustrated in FIG. 3.

Figure 3:
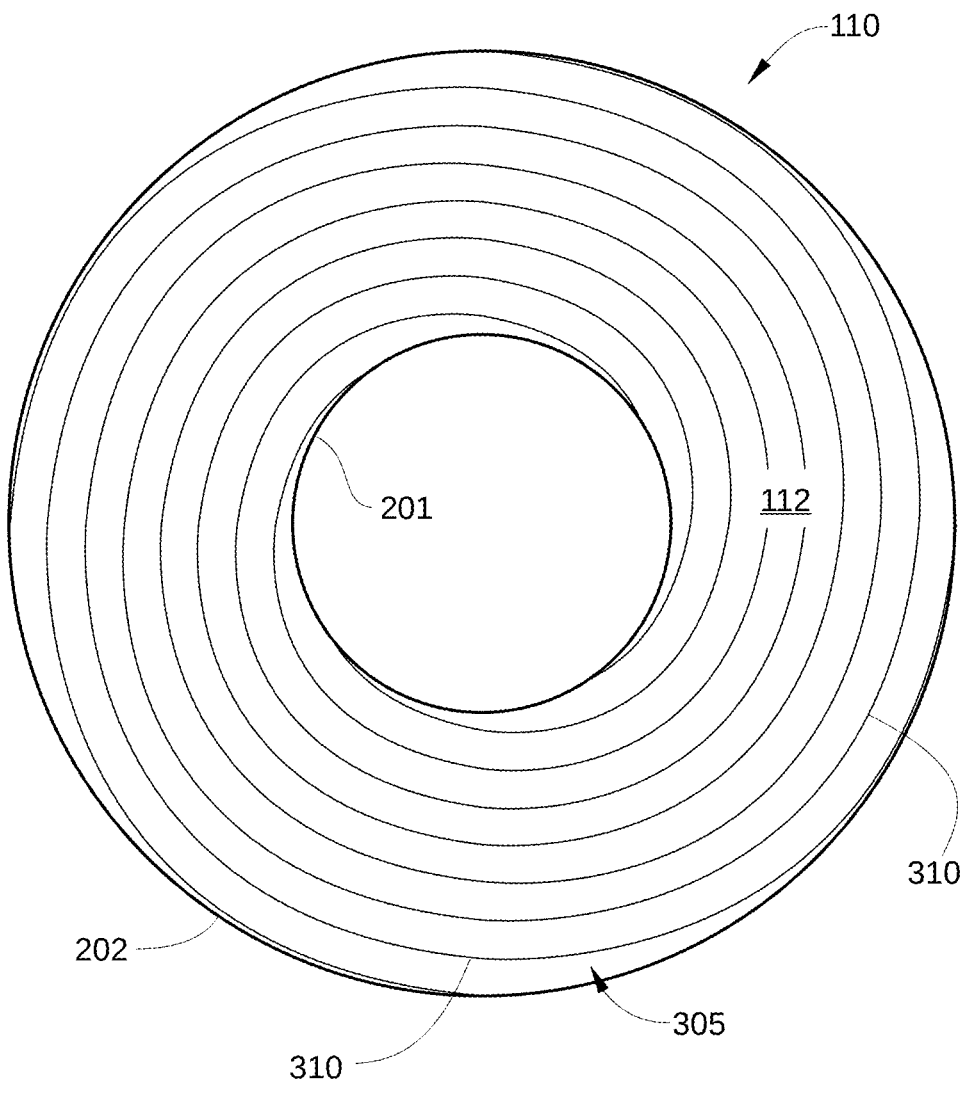
FIG. 3 is a more detailed schematic illustration of a data storage track and an associated enhanced servo sector formed thereon, according to an embodiment.

FIG. 3 illustrates storage disk 110 prior to undergoing an SSW process, according to one embodiment. As shown, storage disk 110 has a spiral set 305 written thereon that includes a plurality of servo spirals 310 that are each circumferentially spaced from adjacent servo spirals 310. It is noted that the number of servo spirals 310 in spiral set 305 is generally larger than that shown in FIG. 3, for example as few as ten or twenty, or as many as several hundred.

Spiral set 305 may be any set of servo spirals configured to provide timing and position information for the servo system of HDD 100 to position a write head while writing the product servo patterns for each data storage track of HDD 100, such as servo wedges 200 shown in FIG. 2. In some embodiments, spiral set 305 may be written onto a substantially blank surface 112 of storage disk 110 without the aid of external equipment using read/write head 127 and the servo system of HDD 100. In such embodiments, spiral set 305 is written onto surface 112 after surface 112 has another set of coarse servo spirals has been written thereon (not shown for clarity), for example, via a bootstrap spiral-writing process. In such embodiments, servo spirals 310 are typically written onto surface 112 using closed-loop tracking of the previously written coarse servo spirals to determine the radial location of read/write head 127, and are used for the writing of servo sector information on surface 112 by HDD 100 in an SSW process.

Ideally, during a spiral-based SSW process, servo spirals 310 are written by moving read/write head 127 with a constant radial velocity relative to surface 112. In this way, a uniform circumferential spacing is maintained between servo spirals 310. As a result, using the set of uniformly spaced servo spirals 310, a servo system of HDD 100 can precisely determine the radial position of read/write head 127 while the write head writes servo sector information on surface 112 for each data storage track 260. A portion of a set of ideal servo spirals is described below in conjunction with FIG. 4.

Figure 4:
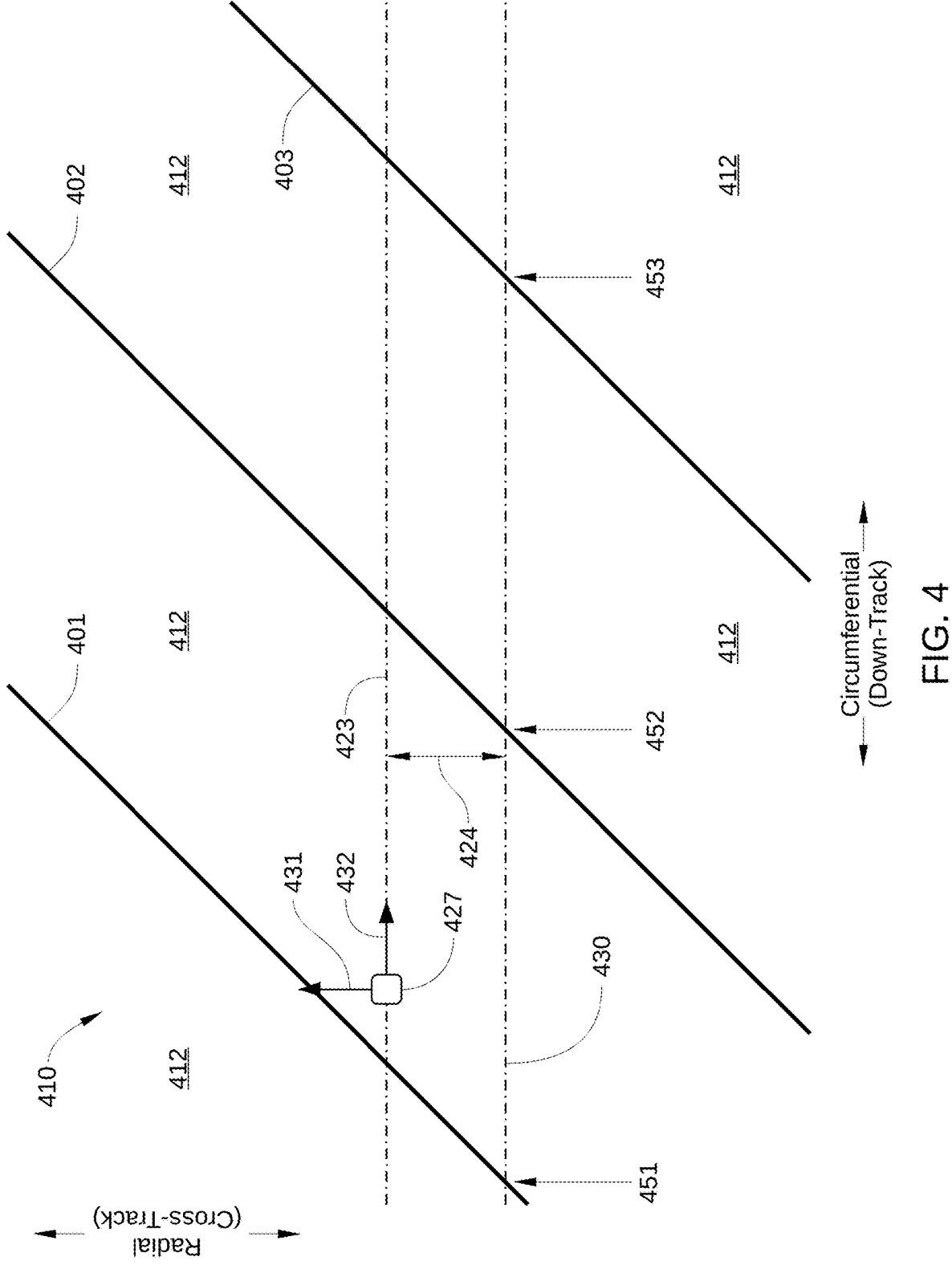
FIG. 4 schematically illustrates a portion of a spiral set of ideally written servo spirals, according to various embodiments.

FIG. 4 schematically illustrates a portion of a set of ideally written servo spirals 410, according to various embodiments. Each ideally written servo spiral 410 is formed or written as a pattern on a recording surface 412 of an HDD, which can be consistent with recording surface 112 of FIGS. 1-3. Ideally written servo spirals 410 can be any set of servo spirals configured to provide timing and position information for the servo system of the HDD to position a write head while writing servo patterns and/or other servo information for the data storage tracks of the HDD. As shown, each ideally written servo spiral 410 extends across recording surface 412 in a radial (cross-track) direction and a circumferential (down-track) direction, and therefore appears as a diagonal line relative to the radial and circumferential directions.

Also shown in FIG. 4 is a read element 427, which is a reading element of a read/write head (not shown) that can be consistent with read/write head 127 of FIG. 1. Rotation of recording surface 412 results in motion 432 of read element 427 in the circumferential direction relative to recording surface 412, and radial actuation of an actuator for read element 427 results in motion 431 of read element 427 in a positive or negative radial direction relative to recording surface 412. Because recording surface 412 rotates at a constant rotational velocity, the circumferential location of read element 427 corresponds to a specific time that is known by the servo system of HDD 100. Thus, when radially positioned at a target radial location 430, read element 427 crosses a first ideally written servo spiral 401 at an expected intersection time 451, a second ideally written servo spiral 402 at an expected intersection time 452, and a third ideally written servo spiral 403 at an expected intersection time 453.

Ideally written servo spirals 410 each include sync marks (not shown), which are separated circumferentially from adjacent sync marks by a constant timing interval. Therefore, as read element 427 passes over an ideally written servo spiral 410, the sync marks included in each ideally written servo spiral 410 are read by read element 427 and thereby provide timing information to the servo system of HDD 100. Further, using techniques well-known in the art, the timing information provided by such sync marks and an estimated slope of ideally written servo spirals 410 enables the determination of a current radial position 423 of read element 427 relative to recording surface 412.

A PES 424 of read element 427 relative to target radial location 430 can be determined based on current radial position 423 of read element 427. Typically, PES 424 of read element 427 is a difference between current radial position 423 of read element 427 and target radial position 430 of read element 427, and ideally remains below a predetermined threshold value during an SSW process. In an SSW process, a write element of the magnetic head that includes read element 427 writes servo patterns and/or other servo sector information for a data storage track that is associated with target radial position 430. To accurately write the servo patterns for the data storage track, and thereby prevent track squeeze and other problems, PES 424 of read element 427 remains below a predetermined threshold value while the write element writes the servo patterns to recording surface 412.

As noted previously, it is generally desirable for the product servo patterns (e.g., servo wedges 200 in FIG. 2) to be written to recording surface 412 so that the written-in coherent repeatable runout (RRO) of the resultant servo pattern is minimized. As a result, during normal operation, the product servo patterns for each data storage track closely correspond to a natural path of the magnetic head over recording surface 412 when no control is applied to the actuator (e.g., voice coil motor 128 in FIG. 1) of the magnetic head. In the instance illustrated in FIG. 4, ideally written servo spirals 410 are shown to be free of written-in coherent RRO. Therefore, in FIG. 4, target radial position 430 corresponds to an uncontrolled path of read element 427 over recording surface 412, which is a substantially circular path. In practice, however, the servo spirals used for self-servo writing typically have significant coherent RRO components, for example due to macroscopic deflections of the disk and/or inaccurate positioning of the write head while the servo spirals are being written. Examples of such servo spirals are described below in conjunction with FIG. 5.

Figure 5:
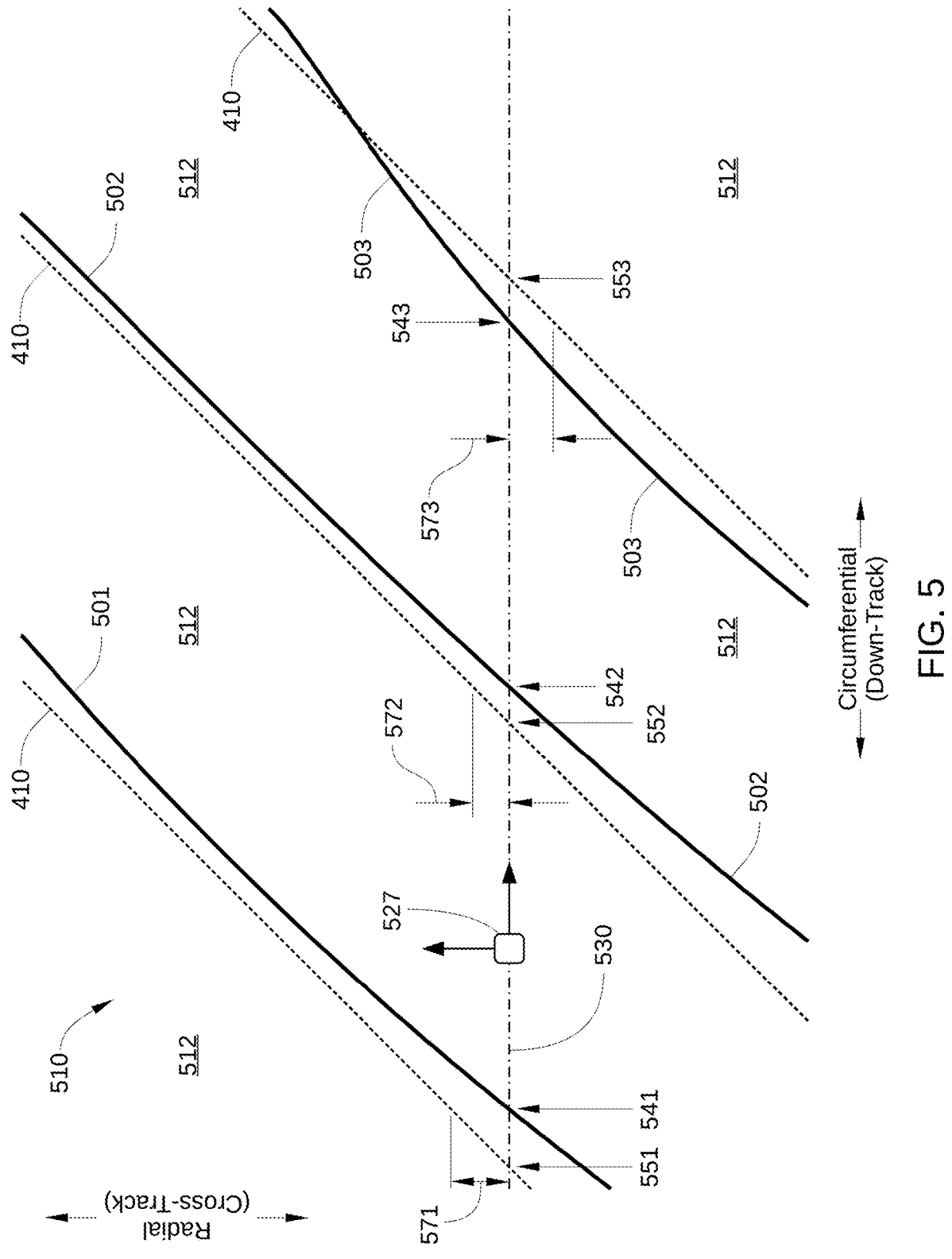
FIG. 5 schematically illustrates a portion of a spiral set of non-ideal servo spirals, according to various embodiments.

FIG. 5 schematically illustrates a portion of non-ideal servo spirals 510, according to various embodiments. Non-ideal servo spirals 510 can be any set of servo spirals configured to provide timing and position information for the servo system of the HDD to position a write head during an SSW process. Similar to ideally written servo spirals 410 of FIG. 4, each non-ideal servo spiral 510 is formed or written as a pattern on a recording surface 512 of an HDD, which can be consistent with recording surface 112 of FIGS. 1-3. For reference, the path of an ideally written servo spiral 410 (dashed lines) that corresponds to each non-ideal servo spiral 510 is also included in FIG. 5. In the instance illustrated in FIG. 5, non-ideal servo spirals 510 includes a first servo spiral 501, a second servo spiral 502, and a third spiral 503.

As shown, each non-ideal servo spiral 510 extends across recording surface 512 of a storage disk in a radial (cross-track) direction and a circumferential (down-track) direction, but deviates from the path of a corresponding ideally written servo spiral 410. For example, storage disk vibration, runout of spindle motor 114 (shown in FIG. 1), and/or other forces acting on the storage disk can produce deflections of recording surface 512, so that the storage disk has a non-planar shape. In addition, inaccuracies in the positioning of a write head while non-ideal servo spirals 510 are being written to recording surface 512 can also cause each non-ideal servo spiral 510 to deviate from the ideal path (indicated by an ideally written servo spiral 410) for that non-ideal servo spiral 510.

Because of the above-described deviations, some or all of non-ideal servo spirals 510 are not crossed by a read/write head at an expected time when the read/write head is at a particular target radial position. Thus, such non-ideal servo spirals 510 include a certain amount of written-in RRO. For example, in the instance illustrated in FIG. 5, a read element 527 crosses first servo spiral 501 at a target radial position 530 at an actual intersection time 541 instead of at an expected intersection time 551. Consequently, when read element 527 is correctly positioned at target radial position 530 and crosses first servo spiral 501 at actual intersection time 541, first servo spiral 501 indicates that read element 527 has a PES of 571 relative to target radial position 530, rather than zero. Similarly, when read element 527 is correctly positioned at target radial position 530 and crosses second servo spiral 502 at an actual intersection time 542 instead of an expected intersection time 552, second servo spiral 502 indicates that read element 527 has a PES of 572 relative to target radial position 530, and when read element 527 is correctly positioned at target radial position 530 and crosses third servo spiral 503 at an actual intersection time 543 instead of an expected intersection time 553, third servo spiral 503 indicates that read element 527 has a PES of 573 relative to target radial position 530.

Due to the above-described written-in RRO inherent in each non-ideal servo spiral 510, non-ideal servo spirals 510 generally indicate an incorrect PES value for read element 527. When such incorrect PES values are indicated during an SSW process, product servo patterns that are intended to be written to recording surface 512 along target radial position 530 can instead be written along a path with undesirable written-in RRO that varies from target radial position 530. To prevent the written-in RRO of non-ideal servo spirals 510 from being passed on to product servo patterns in this way, during the SSW process appropriate RRO correction factors are computed for each servo spiral at target radial position 530 and injected into the servo loop when the product servo patterns for the data track that corresponds to target radial position 530 are being written. The effect of such correction factors is to cause read element 527 to follow a path that much more closely corresponds to target radial position 530 over recording surface 512, which is typically the uncontrolled path or the circular path of read element 527. As a result, the product servo patterns for the data storage track that corresponds to target radial position 530 can be written with greatly reduced or eliminated written-in coherent RRO.

Coherent RRO Correction for SSW at Reduced Rotational Speed

Performing the SSW process while rotating recording surface 512 at a lower rotational speed than the operational rotational speed of HDD 100 can reduce the written-in non-repeatable runout of the product servo patterns being written. However, as noted previously, the benefits of this reduced written-in non-repeatable runout can be more than offset by the resulting increase in written-in coherent RRO of the product servo patterns when recording surface 512 is rotated at the operational rotational speed. This is because drag and other forces that act on the disk change with rotational speed, causing different disk flutter, motor runout, and the like to occur at the operational rotational speed than at the SSW rotational speed. As a result, target radial position 530, which corresponds to an uncontrolled path of read element 527 over recording surface 512, is generally different at different rotational speeds. Therefore, the RRO correction factors for each non-ideal servo spiral 510 that cause read element 527 to follow target radial position 530 at the lower SSW rotational speed are different than the spiral RRO correction factors needed to cause read element 527 to follow target radial position 530 at the operational rotational speed.

According to various embodiments, an SSW process is performed while rotating recording surface 512 at an SSW rotational speed, such that the resultant product servo patterns have near-zero coherent runout when rotating recording surface 512 at an operational rotational speed. In the embodiments, the natural uncontrolled path of the magnetic head that includes read element 527 is characterized at the operational rotational speed and at the SSW rotational speed, and the difference between the two uncontrolled paths is injected into the servo loop to modify the path of the magnetic head during the SSW process. One embodiment is described below in conjunction with FIG. 6.

Figure 6:
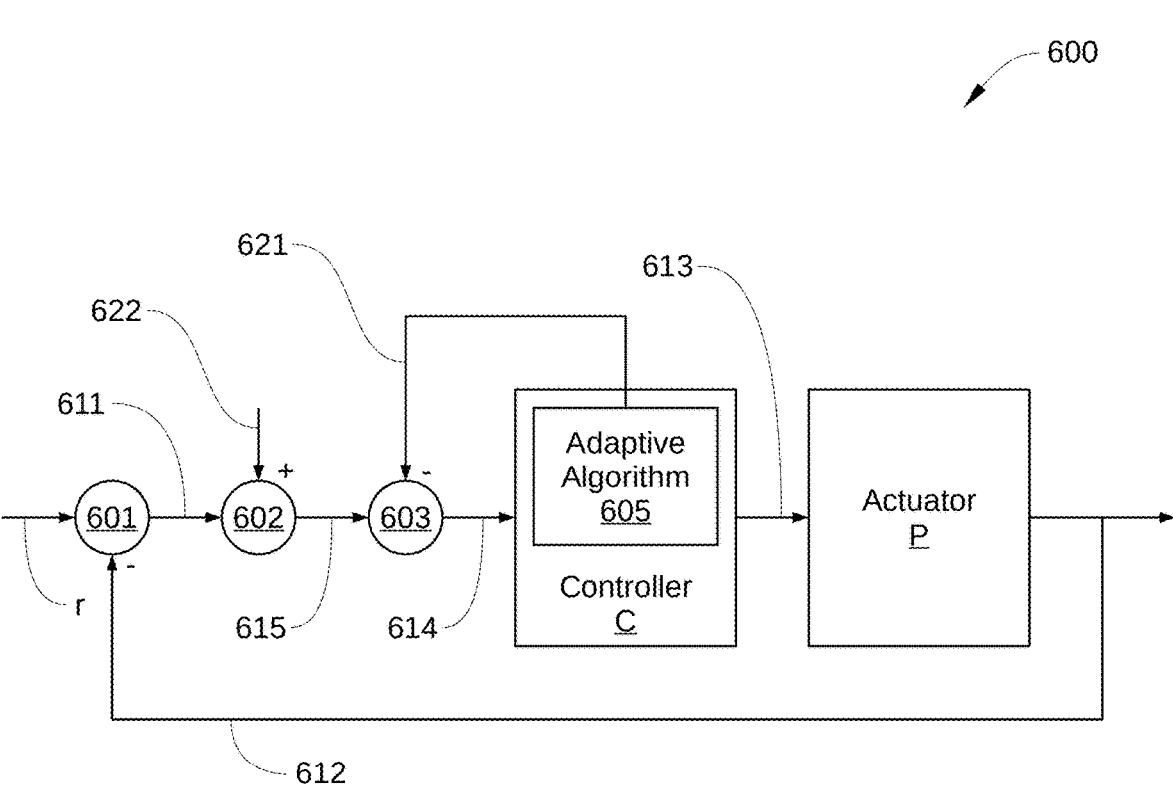
FIG. 6 sets forth a flowchart of method steps for preparing a hard disk drive for operation, according to various embodiments.

FIG. 6 is a schematic diagram of a control system 600 of HDD 100 for determining a set of RRO correction factors for non-ideal servo spirals, according to various embodiments. In some embodiments, control system 600 can be implemented as the servo controller of HDD 100, for example as part of microprocessor-based controller 133 and/or other components of electronic circuits 130 (both shown in FIG. 1).

In some embodiments, for a particular radial location, control system 600 quantitatively characterizes the non-circularity of non-ideal servo spirals by determining a set of written-in RRO values (referred to herein as "non-circularity values") for the non-ideal servo spirals at that particular radial location. Generally, a set of non-circularity values for a particular radial location includes a discrete value for each of the non-ideal servo spirals on a surface of the storage disk. For example, in the instance illustrated in FIG. 5, control system 600 determines, for target radial location 530, a non-circularity value for first servo spiral 501 that corresponds to PES 571, a non-circularity value for second servo spiral 502 that corresponds to PES 572, and a non-circularity value for third servo spiral 503 that corresponds to PES 573.

As shown, control system 600 includes a controller C, an actuator P (such as voice coil motor 128 in FIG. 1), a first summing point 601, a second summing point 602, and a third summing point 603. Controller C monitors an error, such as PES 611, between a measured radial position 612 and a target radial position r, then generates a control signal 613 that is transmitted to actuator P. In addition, in some embodiments, controller C includes an adaptive algorithm 605, such as an iterative learning control (ILC) algorithm, that can determine a set of non-circularity values for a particular radial location or radial region on the storage disk.

In such embodiments, adaptive algorithm 605 characterizes a set of non-circularity values for a given radial location or radial region by collecting coherent RRO values for each servo spiral over multiple revolutions of the storage disk, then mathematically reconstructing the written-in RRO component for each servo spiral by convolving the coherent RRO with the inverse sensitivity transfer function of the servo loop. In some embodiments, to eliminate track-to-track variations in the written-in coherent RRO components due to media noise, the coherent RRO values for each spiral are collected over a plurality of radial locations that correspond to a set of adjacent storage track locations (e.g., tens or hundreds of radial locations). The above-described technique is well-known and widely applied in the disk drive industry.

In operation, control system 600 determines a set of non-circularity values for a given radial location or radial region by receiving measured radial position 612 at first summing point 601 to generate PES 611, adding a non-coherent RRO correction value 621 at third summing point 603 to PES 611, and generating control signal 613 for actuator P based on a final error 614, where final error 614 is the difference between a modified error 615 and non-coherent RRO correction value 621. It is noted that when control system 600 determines a set of non-circularity values, a correction factor 622 of zero is used to modify PES 611 at second summing point 602. Thus, in such instances, modified error 615 is equal to PES 611. Over multiple revolutions of the storage disk, adaptive algorithm 605 generates values for non-coherent RRO correction value 621 that converge with PES 611 until final error 614 is substantially equal to 0 (e.g., within a specified threshold).

According to various embodiments, control system 600 determines two sets of non-circularity values for non-ideal servo spirals at a particular radial location or radial region. Specifically, control system 600 determines a first set of coherent written-in non-circularity values $W_{SSW}$ for the servo spirals at a particular radial location or radial region while the storage disk of HDD 100 is rotated at a SSW rotational speed, where $W_{SSW}=\{y_1, y_2, \ldots y_K\}$ for a storage disk with K servo wedges formed thereon. In addition, control system 600 determines a second set of coherent written-in non-circularity values $W_{Operational}$ for the servo spirals at the particular radial location or radial region while the storage disk is rotated at an operational rotational speed, where $W_{Operational}=\{x_1, x_2, \ldots x_K\}$ for the storage disk with K servo wedges formed thereon. Based on the first set coherent written-in of non-circularity values $W_{SSW}$ and the second set of coherent written-in non-circularity values $W_{Operational}$, control system 600 then determines a set of servo spiral correction factors $W_{Correction}$, where $W_{Correction}=\{(x_1-y_1), (x_2-y_2), \ldots (x_K-y_K)\}$. In some embodiments additional filtering is applied to $W_{Correction}$ to remove undesired frequency components or to adjust some frequency component. The set of servo spiral correction factors $W_{Correction}$ are then injected at 622 during a SSW process, in which the storage disk is rotated at the SSW rotational speed, to write product servo patterns for the particular data storage track associated with $W_{Correction}$. It is noted that the set of servo spiral correction values $W_{Correction}$ is employed at the SSW rotational speed, and each spiral offset value in the set is based on the difference between the natural uncontrolled path of the magnetic head at the operational rotational speed and the natural uncontrolled path of the magnetic head at the SSW rotational speed. As a result, the product servo patterns that are written during the SSW process while the storage disk is rotated at the SSW rotational speed have near-zero coherent runout when the storage disk is rotated at the operational rotational speed.

As noted above, for a particular radial location or radial region, control system 600 determines a set of servo spiral correction values $W_{Correction}$. In operation, control system 600 determines an additional set of non-coherent RRO correction values $W_{WORF}$ to correct non-coherent RRO (shown as non-coherent RRO correction value 621 in FIG. 6) for a particular radial location by rotating a storage disk with servo spirals formed thereon at an SSW rotational speed and positioning a magnetic head at the radial location using the servo spirals. When the magnetic head crosses a particular servo spiral k, control system 600 receives measured radial position 612 at first summing point 601 to generate PES 611. Control system 600 then modifies PES 611 at summing point 602 with a specific coherent RRO correction value (shown as correction factor 622 in FIG. 6) by injecting the $W_{Correction}$ value that corresponds to servo spiral k. In this way, when the magnetic head crosses servo spiral k, control system 600 generates modified error 615 by injecting a disturbance into the servo loop that corresponds to the difference between the coherent written-in non-circularity value for servo spiral k in $W_{Operational}$ and the coherent written-in non-circularity value for servo spiral k in $W_{SSW}$. Control system 600 then adds a non-coherent RRO correction value 621 (taken from the set of non-coherent RRO correction values $W_{WORF}$ for the current radial location) to modified error 615 at third summing point 603, and generates control signal 613 for actuator P based on a final error 614, where final error 614 is the difference between modified error 615 and non-coherent RRO correction value 621. Over repeated revolutions of the storage disk, adaptive algorithm 605 generates values for non-coherent RRO correction value 621 at servo wedge k that converge with modified error 615 until final error 614 is substantially equal to 0 (e.g., within a specified threshold).

Procedure for Coherent RRO Correction

FIG. 7 sets forth a flowchart of method steps for performing an SSW process in an HDD while rotating disks at an SSW rotational speed that is different than an operational rotational speed of the HDD, according to various embodiments. The method steps may include one or more operations, functions, or actions as illustrated by one or more of blocks 701-706. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-6, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits.

A method 700 begins at step 701, where a suitable controller (e.g., servo controller 600 of HDD 100) causes servo spirals to be written on one or more recording surfaces 112 of HDD 100. In some embodiments, the servo spirals are written by HDD 100 via a conventional bootstrap spiral-writing process. In such embodiments, one or more sets of coarse servo spirals may be sequentially written on one or more recording surfaces 112 of HDD 100 before the final K servo spirals that are employed in method 700 are written to one or more recording surfaces 112.

In step 702, for each of multiple radial locations or radial regions, the controller determines a set of coherent written-in non-circularity values $W_{Operational}$ for the servo spirals while storage disk 110 is rotated at the operational rotational speed of HDD 100, for example, 7200 RPM. Thus, for each of the K servo spirals written on recording surface 112, the set of coherent written-in non-circularity values $W_{Operational}$ includes a discrete non-circularity value. As described above in conjunction with FIG. 6, the controller determines the set of coherent written-in non-circularity values $W_{Operational}$ for a particular data storage track over multiple revolutions of storage disk 110. Specifically, the controller receives measured radial position 612 at first summing point 601 to generate PES 611, adds a non-coherent RRO correction value 621 at third summing point 603 to PES 611, and generates control signal 613 for actuator P based on a final error 614, where final error 614 is the difference between PES 611 and non-coherent RRO correction value 621. In step 702, when control system 600 determines the set of non-circularity values (set of coherent written-in non-circularity values $W_{Operational}$) for a given radial location or radial region, a correction factor 622 of zero is used to modify PES 611 at second summing point 602.

In some embodiments, a radial region for which the controller determines a set of coherent written-in non-circularity values $W_{Operational}$ can include a set of contiguous data storage tracks. For example, in some embodiments, each radial region can be implemented as a group of N data storage tracks, where N can be any suitable number of data storage tracks within which the values of written-in non-circularity values are substantially constant from track to track. In such embodiments, N can range from as few as 10 data storage tracks to 10,000 data storage tracks or more. Alternatively, in some embodiments, each radial region for which the controller determines a set of coherent written-in non-circularity values $W_{Operational}$ can be a different zone of recording surface 112. For example, in such embodiments, a first such zone includes a region proximate ID 201 of storage disk 110, a second such zone includes the region that is adjacent to the first region and closer to OD 202 of storage disk 110, a third such zone includes the region that is adjacent to the second region and closer to OD 202 of storage disk 110, and so on.

In step 703, for each of the multiple radial regions, the controller determines a set of coherent written-in non-circularity values $W_{SSW}$ for the servo spirals while storage disk 110 is rotated at the SSW rotational speed. For example, storage disk 110 can be rotated at 5400 RPM, or some other rotational speed that is significantly less than the operational rotational speed of HDD 100. For each of the K servo spirals written on recording surface 112, the set of coherent written-in non-circularity values $W_{SSW}$ includes a discrete non-circularity value that can be determined in a fashion consistent with the process described in step 702 for determining the set of coherent written-in non-circularity values $W_{Operational}$. In step 703, the controller determines the set of coherent written-in non-circularity values $W_{SSW}$ for the same radial regions used in step 702.

In step 704, for each of the multiple radial regions, the controller determines a set of servo spiral correction factors $W_{Correction}$ based on the set of coherent written-in non-circularity values $W_{SSW}$ and the set of coherent written-in non-circularity values $W_{Operational}$ for the radial region. For example, in some embodiments, for a particular radial region, $W_{Correction} = W_{Operational} - W_{SSW}$. Consequently, a value in the set of servo spiral correction factors $W_{Correction}$ for a particular servo spiral k associated with a given radial region is a difference between the coherent written-in non-circularity value in $W_{Operational}$ for servo spiral k and the coherent written-in non-circularity value in $W_{SSW}$ for servo spiral k. Thus, in such embodiments, $W_{Correction} = \{(x_1 - y_1), (x_2 - y_2), \ldots (x_K - y_K)\}$. In some embodiments additional filtering is applied to $W_{Correction}$ to remove undesired frequency components or to adjust some frequency component.

In step 705, for each of the multiple radial regions, the controller employs set of servo spiral correction values $W_{Correction}$ to perform an SSW process while storage disk 110 is rotated at the SSW rotational speed. In particular, for each of the multiple radial regions, while storage disk 110 is rotated at the SSW rotational speed, the controller injects $W_{Correction}$ for the radial region as an input disturbance to the servo loop. Thus, for a given data storage track associated with a given radial region, the controller generates modified error 615 by modifying PES 611 at summing point 602 with a specific servo spiral correction value $W_{Correction}$ (shown as correction factor 622 in FIG. 6) that corresponds to the current servo spiral. Over repeated revolutions of the storage disk, the controller employs adaptive algorithm 605 to generate non-coherent RRO correction values $W_{WORF}$ for non-coherent RRO correction value 621 at the current servo wedge that converge with modified error 615 until final error 614 is substantially equal to 0.

In step 705, the controller performs the SSW process at the SSW rotational speed to write product servo patterns on storage disk 110 for each data storage track. In the SSW process, at each radial region, the controller employs the set of servo spiral correction values $W_{Correction}$ for the current radial region as written-in non-circularity values instead of the set of coherent written-in non-circularity values $W_{SSW}$ for the current radial region. As a result, the product servo patterns so written follow a non-circular path that deviates significantly from the uncontrolled path of the magnetic head while rotating storage disk 110 at the SSW rotational speed. Consequently, the resultant product servo patterns that are written in the above process follow a non-circular path when storage disk 110 is rotated at the SSW rotational speed. However, when storage disk 110 is rotated at the operational rotational speed, changes in the shape and behavior of storage disk 110 at the operational rotational speed cause the product servo patterns to follow a path that closely corresponds to the uncontrolled path of the magnetic head while rotating storage disk 110 at the operational rotational speed. Thus, by using servo spiral correction values $W_{Correction}$ for the current radial region as written-in non-circularity values instead of the set of coherent written-in non-circularity values $W_{SSW}$ for the current radial region, coherent RRO of the resultant product servo patterns is forced to zero at the operational rotational speed. One embodiment of such an SSW process is described below in conjunction with FIG. 8.

In some embodiments, the steps of method 700 are not limited to the sequence described above. For example, in some embodiments, step 702 is performed for all radial regions on a particular recording surface 112, while steps 703-706 are each performed for a single radial region at a time. Thus, in such embodiments, for a given radial region, steps 702-706 are performed in sequence, so that the final product servo patterns for that particular radial region are written to recording surface 112 before the set of coherent written-in non-circularity values $W_{SSW}$, the set of coherent written-in non-circularity values $W_{Operational}$, and the set of servo spiral correction factors $W_{Correction}$ for a subsequent radial region are determined.

In the embodiments described above, the SSW rotational speed is described as a lower rotational speed than the operational rotational speed. In such embodiments, product servo patterns can beneficially be written with less written-in non-repeatable runout without suffering from a significant increase in written-in coherent RRO. Further, in such embodiments, due to the decreased written-in non-repeatable runout resulting from the slower SSW rotational speed, the SSW process may be performed without filling HDD 100 with helium. Instead, the SSW process may be performed while HDD 100 is filled with ambient air, which is greatly simplifies the manufacturing process. In other embodiments, the SSW rotational speed can be a higher rotational speed than the operational rotational speed. In such embodiments, an SSW process can be performed more quickly than using conventional approaches and without suffering from a significant increase in written-in coherent RRO.

Figure 8:
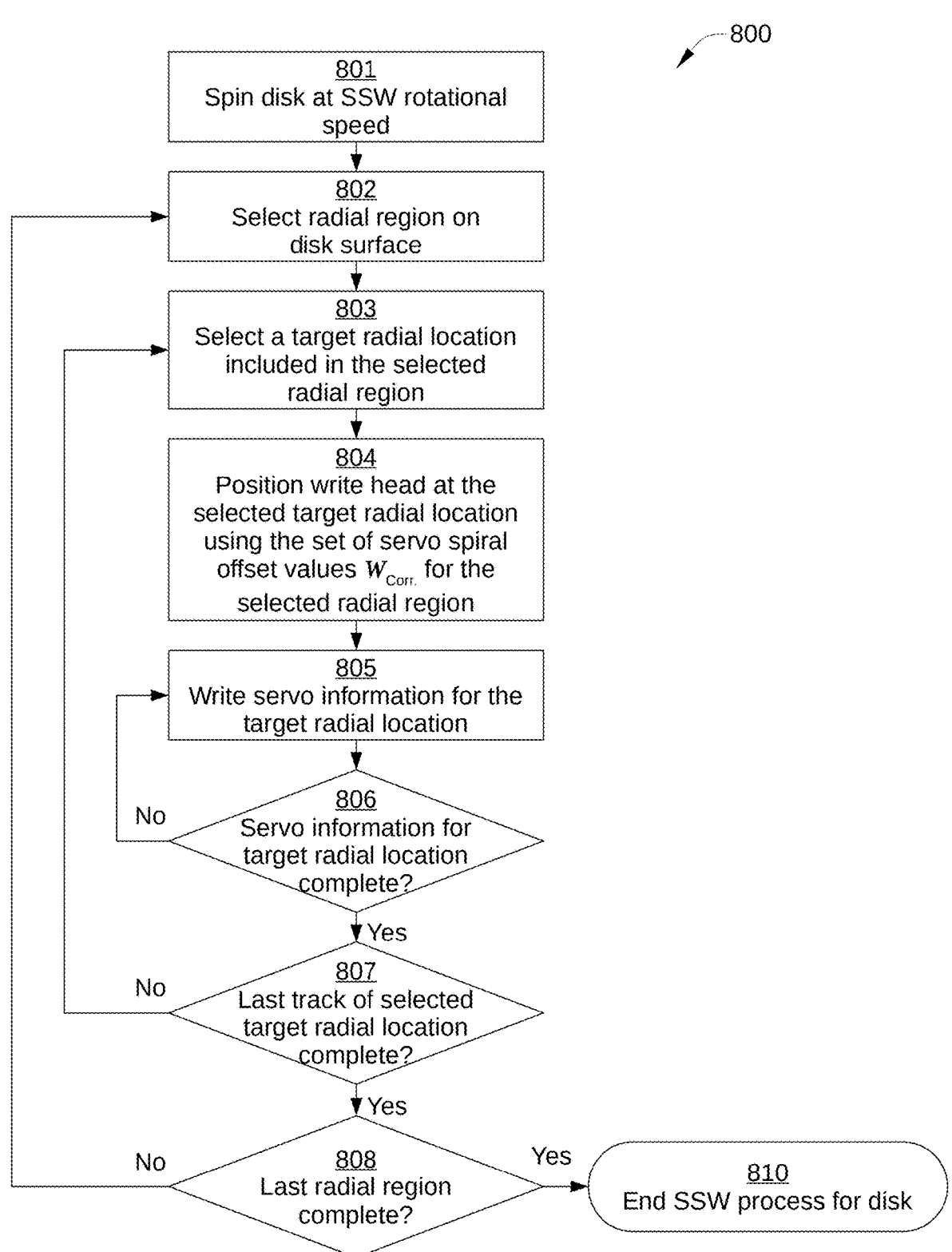
FIG. 8 sets forth a flowchart of method steps for performing an SSW process in a hard disk drive while rotating disks at a self-servo writing rotational speed that is different than an operational rotational speed of the drive, according to various embodiments For clarity, identical reference numbers have been used, where applicable, to designate identical elements that are common between figures. It is contemplated that features of one embodiment may be incorporated in other embodiments without further recitation.

FIG. 8 sets forth a flowchart of method steps for performing an SSW process in an HDD while rotating disks at an SSW rotational speed that is different than an operational rotational speed of the HDD, according to various embodiments. In some embodiments, the method steps can be an implementation of step 705 of FIG. 7. The method steps may include one or more operations, functions, or actions as illustrated by one or more of blocks 801-810. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-6, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits.

A method 800 begins at step 801, where a suitable controller (e.g., servo controller 600 of HDD 100) causes storage disk 110 to be rotated at an SSW rotational speed. As noted previously, in some embodiments, the SSW rotational speed can be less than an operational rotational speed of HDD 100, to write servo patterns with less written-in non-repeatable runout. In other embodiments, the SSW rotational speed can be greater than the operational rotational speed of HDD 100, to decrease the time required to perform the SSW process in HDD 100.

In step 802, the controller selects a radial region on storage disk 110. In some embodiments, the controller begins the SSW process at a radial region that is adjacent to ID 201 and moves progressively outward until the SSW process has been performed at all radial regions. In other embodiments, the controller begins the SSW process at a radial region that is adjacent to OD 202 and moves progressively inward until the SSW process has been performed at all radial regions.

In step 803, the controller selects a target radial location that is included in the selected radial region. For example, in some embodiments, the target radial location corresponds to the next data storage track for which servo patterns are to be written. Thus, in step 803, the controller selects a location at which no data storage track has yet been written.

In step 804, the controller causes the position of the write head of read/write head 127 to be controlled at the selected target radial location using the set of servo spiral correction values $W_{Correction}$ for the selected radial region. It is noted that in many embodiments a single set of servo spiral correction values $W_{Correction}$ is employed for a plurality of data storage tracks. As described above in conjunction with FIG. 7, the controller (e.g., control system 600) modifies PES 611 at summing point 602 with a specific coherent RRO correction value (correction factor 622 in FIG. 6) by injecting the $W_{Correction}$ value that corresponds to servo spiral k.

In step 805, the controller causes servo information, such as servo patterns and/or other servo information, to be written to the selected data storage track. In step 806, the controller determines whether the servo information for the selected storage track has been completed. If yes, method 800 proceeds to step 807; if no, method 800 returns to step 805 and servo information continue to be written to the selected data storage track.

In step 807, the controller determines whether the SSW process for the last track of the selected radial region has completed. If yes, method 800 proceeds to step 808; if no, method 800 returns to step 803 and a new track location is selected for the writing of servo information.

In step 808, the controller determines whether the SSW process for the last radial region has completed. If yes, method 800 proceeds to step 810 and ends; if no, method 800 returns to step 802 and a new radial region is selected to undergo the SSW process.

While the foregoing is directed to embodiments of the present invention, other and further embodiments of the invention may be devised without departing from the basic scope thereof, and the scope thereof is determined by the claims that follow.

We claim:

1. A computer-implemented method of writing servo information on a magnetic disk, the method comprising:
   while rotating the magnetic disk at a first rotational speed, controlling a radial position of a magnetic head to be at a target radial location based on a set of servo spirals formed on a surface of the magnetic disk; and
   while the magnetic disk is rotated at the first rotational speed and the magnetic head is controlled to be at the target radial location, for each spiral included in the set of servo spirals:
   receiving a position error signal associated with crossing the servo spiral;
   modifying the position error signal with a correction factor that is based on a first non-circularity value associated with the servo spiral at the target radial location and a second non-circularity value associated with the servo spiral at the target radial location, wherein the first non-circularity value for the spiral is determined while rotating the magnetic disk at the first rotational speed and the second non-circularity value is determined while rotating the magnetic disk at a second rotational speed that is different from the first rotational speed; and
   writing a set of servo wedges at the target radial location.

2. The computer-implemented method of claim 1, wherein writing the set of servo wedges at the target radial location comprises determining a non-coherent repeatable runout value for the spiral.

3. The computer-implemented method of claim 2, wherein determining the non-coherent repeatable runout value comprises adding a first non-coherent repeatable runout value to the position error signal during a first revolution of the magnetic disk.

4. The computer-implemented method of claim 3, wherein determining the non-coherent repeatable runout value further comprises adding a second non-coherent repeatable runout value during a second revolution of the magnetic disk to a subsequent position error signal that is associated with crossing the servo spiral during the second revolution.

5. The computer-implemented method of claim 3, wherein determining the first non-coherent repeatable runout value comprises generating the first non-coherent repeatable runout value with an adaptive algorithm.

6. The computer-implemented method of claim 1, wherein the first rotational speed is greater than the second rotational speed.

7. The computer-implemented method of claim 1, wherein the second rotational speed is greater than the first rotational speed.

8. The computer-implemented method of claim 1, wherein the second rotational speed is an operational rotational speed of the magnetic disk.

9. The computer-implemented method of claim 1, wherein the target radial location is one of a plurality of target radial locations that are associated with a specific radial region.

10. The computer-implemented method of claim 9, wherein the first non-circularity value for the spiral is associated with each target radial location that is associated with the specific radial region.

11. The computer-implemented method of claim 9, wherein the second non-circularity value for the spiral is associated with each target radial location that is associated with the specific radial region.

12. The computer-implemented method of claim 1, wherein the target radial location corresponds to a location of a data storage track of the magnetic disk.

13. The computer-implemented method of claim 1, wherein determining the first non-circularity value for the spiral comprises generating the first non-circularity value for the spiral with an adaptive algorithm.

14. A disk drive, comprising:
a magnetic head;
a magnetic disk with a set of servo spirals formed on a surface of the magnetic disk; and
a controller configured to perform the steps of:
while rotating the magnetic disk at a first rotational speed, controlling a radial position of the magnetic head to be at a target radial location based on a set of servo spirals formed on the surface of the magnetic disk; and
while the magnetic disk is rotated at the first rotational speed and the magnetic head is controlled to be at the target radial location, for each spiral included in the set of servo spirals:
receiving a position error signal associated with crossing the servo spiral;
modifying the position error signal with a correction factor that is based on a first non-circularity value associated with the servo spiral at the target radial location and a second non-circularity value associated with the servo spiral at the target radial location, wherein the first non-circularity value for the spiral is determined while rotating the magnetic disk at the first rotational speed and the second non-circularity value is determined while rotating the magnetic disk at a second rotational speed that is different from the first rotational speed; and
writing a set of servo wedges at the target radial location.

15. The disk drive of claim 14, wherein the disk drive is filled with ambient air while writing the set of servo wedges at the target radial location.

16. The disk drive of claim 14, wherein writing the set of servo wedges at the target radial location comprises determining a non-coherent repeatable runout value for the spiral.

17. The disk drive of claim 16, wherein determining the non-coherent repeatable runout value comprises adding a first non-coherent repeatable runout value to the position error signal during a first revolution of the magnetic disk.

18. The disk drive of claim 14, wherein the first rotational speed is greater than the second rotational speed.

19. The disk drive of claim 14, wherein the second rotational speed is greater than the first rotational speed.

20. The disk drive of claim 14, wherein the first non-circularity value for the spiral is associated with each target radial location that is associated with the specific radial region.

* * * * *